INVENTORS
H. M. FOX
F. N. RUEHLEN
BY Young and Quigg
ATTORNEYS

INVENTORS
H. M. FOX
F. N. RUEHLEN
BY
*Young and Quigg*
ATTORNEYS

3,511,760
Patented May 12, 1970

1

3,511,760
ELECTROCHEMICAL FLUORINATION OF
ORGANIC COMPOUNDS
Homer M. Fox and Forrest N. Ruehlen, Bartlesville,
Okla., assignors to Phillips Petroleum Company, a corporation of Delaware
Continuation-in-part of application Ser. No. 435,263,
Feb. 25, 1965. This application Nov. 2, 1967, Ser.
No. 683,089
Int. Cl. B01k 3/00
U.S. Cl. 204—59                                   20 Claims

ABSTRACT OF THE DISCLOSURE

Fluorinatable feedstocks are electrochemically fluorinated in an electrolysis cell provided with a porous anode and using an anhydrous liquid hydrogen fluoride electrolyte. The fluorination is carried out under conditions such that it occurs within the pores of the anode.

---

This application is a continuation-in-part of our copending application Ser. No. 435,263, filed Feb. 25, 1965, now abandoned.

This invention relates to electrochemical fluorination. In one aspect this invention relates to a process for preparing fluorine-containing compounds by electrochemical fluorination of a fluorinatable compound.

Fuorine-containing organic compounds are known to possess value in many fields of industrial chemistry. For example, many of the lower molecular weight compounds are useful as refrigerants, dielectrics, fire extinguishing materials, and as aerosol propellants. Many fluorine-containing compounds are also useful as intermediates for the production of plastics and synthetic elastomers. A numer of techniques are known for producing fluorine-containing organic compounds. These include pyrolysis techniques in which fluorine-containing materials are pyrolyzed in the presence of carbon or carbon-containing materials to obtain a mixture of fluorinated compounds. Another technique is to electrolyze a mixture of an electrolyzable fluoride having the compound to be fluorinated dissolved therein. In many instances, a wider commercial application of fluorine-containing organic compounds has been limited due to difficulties in their preparation. Many of the prior art processes for preparing such compounds involve several chemical and mechanical steps and require the utilization of costly starting materials. Furthermore, when employing the methods of the prior art it is difficult to produce moderately or only partially fluorinated products in satisfactory yields. It is even more difficult to produce moderately or partially fluorinated products, e.g., fluorinated hydracarbons, containing fluorine atoms in certain specific locations in the molecule. It is also difficult to produce fluorinated products electrochemically at high rates of conversion and avoid the formation of substantial amounts of cleavage products.

The present invention provides a solution for the above-described difficulties. We have now discovered an improved electrochemical process for efficiently and conveniently preparing fluorine-containing compounds. In our process the extent of fluorination of the fluorinatable compound can be readily controlled. Consequently, our process is capable of producing a wide variety of fluorine-containing products with high efficiency and good selectivity. Compared with the fluorination processes of the prior art, the reaction conditions utilized in our process are mild, and the yields of product per kilowatt hour or per unit of anode area are extraordinarily high. Furthermore, as discussed further hereinafter, we have found that we can introduce more fluorine into a fluorinatable compound per kilowatt hour or per unit of anode area (in the order of at least 100 times as much or more in some instances) than can be accomplished in processes of the prior art.

Another surprising result or advantage of our invention is that the primary products obtained in our process are predominantly partially fluorinated materials. It is difficult to obtain such materials in the methods of the prior art and, as stated above, even more difficult to produce moderately fluorinated hydrocarbons containing fluorine atoms in certain specific locations in the molecule. It is the reactive nature of fluorine to bind itself to a carbon atom to which one or more previous fluorine atoms have already been bound. Thus, any difluoro compounds made by direct fluorination techniques of the prior art almost invariably have both the fluorine atoms attached to the same carbon atom. This has made it necessary to employ indirect methods such as the preparation of appropriate chloro- or hydroxy-analogs followed by replacement of such groups with fluorine. Our invention provides a direct fluorination process which unexpectedly produces good yields of difluoro compounds in which the two fluorine atoms are not on the same carbon atom. As specific examples, 1,2-difluoroethane and 1,4-difluorobutane can be easily and directly produced in good yields by the process of our invention. Thus, in one aspect, our invention provides a direct process for the production of such materials directly from a hydrocarbon starting material in a one-step process.

Broadly speaking, the process of our invention comprises electrolyzing a current-conducting essentially anhydrous liquid hydrogen fluoride electrolyte in an electrolysis cell provided with a cathode and a porous anode, introducing a fluorinatable organic compound into the pores of said anode and therein at least partially fluorinating at least a portion of said organic compound within said pores of said anode, and recovering fluorinated compound products from said cell.

An object of this invention is to provide an improved electrochemical process for the production of fluorine-containing compounds. Another object of this invention is to provide an electrochemical process for the production of fluorine-containing organic compounds in good yields and with good selectivity. Another object of this invention is to provide an improved electrochemical process for the production of fluorine-containing compounds which is economical, commercially feasible, provides for the maximum utilization of the starting fluorinatable material, and is accompanied by the minimum formation of undesirable by-products. Another object of this invention is to provide an improved electrochemical process for the production of fluorine-containing organic compounds which process can be readily controlled to yield products having a desired fluorine content. Still another object of this invention is to provide an improved electrochemical fluorination process for the production of partially fluorinated fluorine-containing compounds, such as difluoro compounds, wherein the two fluorine atoms are attached to different carbon atoms. Other aspects, objects, and advantages of the invention will be apparent to those skilled in the art in view of this disclosure.

Thus, according to the invention, there is provided a process for the electrochemical fluorination of a fluorinatable organic compound, which process comprises: passing an electric current through a current-conducting essentially anhydrous liquid hydrogen fluoride electrolyte contained in an electrolysis cell provided with a cathode and a porous anode; passing said organic compounds into the pores of said anode and therein into contact with the fluorinating species produced by said electrolyzing; and recovering fluorinated organic compound as product of the process.

Very few organic compounds are resistant to fluorination. Consequently, a wide variety of feed materials, both normally liquid and normally gaseous compounds, can be used in the practice of this invention. Organic compounds which are normally gaseous or which can be introduced in gaseous state into the pores of a porous anode under the conditions employed in the electrolysis cell, and which are capable of reacting with fluorine, are presently preferred as starting materials in the practice of the invention to produce fluorine-containing compounds. However, it is within the scope of the invention to utilize starting materials which are introduced into the pores of the anode in liquid state. Generally speaking, desirable organic starting materials which can be used are those containing from 1 to 8, preferably 1 to 6, carbon atom per molecule. However, it is within the scope of the invention to utilize reactants which contain more than 6 or 8 carbon atoms. If desired, suitable feed materials having boiling points above cell operating temperatures can be passed into the pores of the porous anode in gaseous state by utilizing a suitable carrier gas. Thus, a suitable carrier gas can be saturated with the feed reactant (as by bubbling said carrier gas through the liquid reactant), and then passing the saturated carrier gas into the pores of the porous anode. Suitable carrier gases include the inert gases such as helium, xenon, argon, neon, krypton, nitrogen, etc. It is also within the scope of the invention to utilize normally gaseous materials such as hydrocarbons containing from 1 to 4 carbon atoms as carrier gases. These latter gases will react, but in many instances this will not be objectionable. It is also within the scope of the invention to utilize the above-described carrier gases, and particularly said inert gases, as diluents for the feedstocks which are normally gaseous at cell operating conditions.

Some general types of starting materials which can be used include, among others, the following: alkanes, alkenes, alkynes, amines, ethers, esters, mercaptans, nitriles, alcohols, aromatic compounds, and partially halogenated compounds of both the aliphatic and aromatic series. It will be understood that the above-named types of compounds can be either straight chain, branched chain, or cyclic compounds. Partially chlorinated and the partially fluorinated compounds are the preferred partially halogenated compounds. The presently preferred starting materials are the saturated and unsaturated hydrocarbons (alkanes, alkenes, and alkynes) containing from 1 to 6 carbon atoms per molecule. The presently more preferred starting materials are the normally gaseous organic compounds, and particularly said saturated and unsaturated hydrocarbons, containing from 1 to 4 carbon atoms per molecule.

Since fluorine is so reactive, no list of practical length could include all starting materials which can be used in the practice of our invention. However, representative examples of the above-described starting materials include, among others, the following: methane; ethane; propane; butane; isobutane; pentane; n-hexane; n-octane; cyclopropane; cyclopentane; cyclohexane; cyclooctane; 1,2-dichloroethane; 1-fluoro-2-chloro-3-methylheptane; ethylene; propylene; cyclobutene; cyclohexene; 2-methylpentene-1; 2,3-dimethylhexene-2; butadiene; vinyl chloride; 3-fluoropropylene; acetylene; methylacetylene; vinylacetylene; 3,3-dimethylpentyne-1; allyl chloride; methylamine; ethylamine; diethylamine; 2-amino-3-ethylpentane; 3-bromopropylamine; triethylamine; dimethyl ether; diethyl ether; methyl ethyl ether; methyl vinyl ether; 2-iodoethyl methyl ether; di-n-propyl ether; methyl formate; methyl acetate; ethyl butyrate; ethyl formate; n-amyl acetate; methyl 2-chloroacetate; methyl mercaptan; ethyl mercaptan; n-propyl mercaptan; 2-mercaptohexane; 2-methyl-3-mercaptoheptane; acetonitrile; propionitrile; n-butyronitrile; acrylonitrile; n-hexanonitrile; methanol; ethanol; isopropanol; n-hexanol; 2,2-dimethylhexanol-3; n-butanol; ethylenebromohydrin; benzene; toluene, cumene; o-xylene; p-xylene; and monochlorobenzene.

The electrochemical process of the invention is carried out in a medium of hydrogen fluoride electrolyte. Although said hydrogen fluoride electrolyte can contain small amounts of water, such as up to about 5 weight percent, it is preferred that said electrolyte be essentially anhydrous. Generally speaking, it is preferred that said electrolyte contain not more than about 0.1 weight percent water. However, commercial anhydrous liquid hydrogen fluoride which normally contains dissolved water in amounts ranging from a trace (less than 0.1 weight percent) up to about 1 percent by weight can be used in the practice of the invention. Thus, as used herein and in the claims, the term "essentially anhydrous liquid hydrogen fluoride," unless otherwise specified, includes liquid hydrogen fluoride which can contain water not exceeding up to about 1 weight percent. As the electrolysis reaction proceeds, any water contained in the hydrogen fluoride electrolyte is slowly decomposed and said electrolyte concomitantly approaches the anhydrous state. In the practice of the invention, when using one of the more expensive feed materials, one preferred method of operation when starting a cell with a new electrolyte which contains traces of water is to electrolyze said electrolyte for a few hours while using an inexpensive feed material such as methane, prior to introducing the more expensive feed material so as to remove said water. The hydrogen fluoride electrolyte is consumed in the reaction and must be either continuously or intermittently placed in the cell.

Pure anhydrous liquid hydrogen fluoride is nonconductive. The essentially anhydrous liquid hydrogen fluorides described above have a low conductivity which, generally speaking, is lower than desired for practical operation. To provide adequate conductivity in the electrolyte, and to reduce the hydrogen fluoride vapor pressure at cell operating conditions, an inorganic additive can be incorporated in the electrolyte. Examples of suitable additives are inorganic compounds which are soluble in liquid hydrogen fluoride and provide effective electrolytic conductivity. The presently preferred additives are the alkali metal (sodium, potassium, lithium, rubidium, and cesium) fluorides and ammonium fluoride. Other additives which can be employed are sulphuric acid and phosphoric acid. Potassium fluoride, cesium fluoride, and rubidium fluoride are the presently preferred additives. Potassium fluoride is the presently most preferred additive. Said additives can be utilized in any suitable molar ratio of additive to hydrogen fluoride within the range of from 1:4.5 to 1:1, preferably 1:4 to 1:2. The presently most preferred electrolytes are those which correspond approximately to the formulas KF·2HF, KF·3HF, or KF·4HF. Such electrolytes can be conveniently prepared by adding the required quantity of hydrogen fluoride to KF·HF (potassium bifluoride). In general, said additives are not consumed in the process and can be used indefinitely. Said additives are frequently referred to as conductivity additives for convenience.

The cell body and the electrodes in the cell must be fabricated of materials which are resistant to the action of the contents of the cell under the reaction conditions. Materials such as steel, iron, nickel, polytetrafluoroethylene (Teflon), carbon, and the like, can be employed for the cell body. The cathode can be fabricated in any suitable shape or design and can be made of any suitable conducting material such as iron, steel, nickel, alloys of said metals, and carbon. The anode must be porous. Said anode can be fabricated from any suitable conducting material which is compatible with the system, e.g., nickel, iron, various metal alloys, and carbon, which is not wetted by the electrolyte. By "not wetted" we mean that the contact angle between the electrolyte and the anode must exceed 90° in order that anticapillary forces will prevent substantial invasion of the small pores of the anode by the electrolyte. Porous carbon, which is economical and readily available in ordinary channels of commerce, is presently preferred for the anode. Porous carbon impregnated with a suitable metal such as nickel can also be used as the anode. Various grades of porous carbon can be used in the practice of the invention. It is preferred to employ porous carbon which has been made from carbon produced by pyrolysis, and not graphitic carbon. Types of commercially available porous carbon are described hereinafter. Said anode can be fabricated in any suitable shape or design, but must be arranged or provided with a suitable means for introducing the feed reactant material into the pores thereof and into contact with the fluorinating species within said pores.

Except for the limitations described above, any convenient cell configuration or electrode arrangement can be employed. The cell must be provided with a vent or vents through which by-product hydrogen can escape and through which volatile cell products can be removed and recovered. If desired or necessary, a drain can be provided on the bottom of the cell for removal of heavier nonvolatile products. The cell can contain an ion permeable membrane or divider, if desired, for dividing the cell into an anode compartment and a cathode compartment. It is frequently preferred to employ such a membrane or divider to prevent hydrogen generated at the cathode from mixing with the volatile fluorinated products produced at the anode. This is done to simplify the purification and isolation of the fluorine-containing products. Any conventionally known resistant membrane or divider material can be employed for this purpose. When the anode products are withdrawn from the cell through a conduit means directly connected to the anode, as described further hereinafter, said divider can be omitted.

The electrochemical conversion can be effectively and conveniently carried out over a broad range of temperatures and pressures limited only by the freezing point and the vapor pressure of the electrolyte. Generally speaking, the process of the invention can be carried out at temperatures within the range of from minus 80° to 500° C. at which the vapor pressure of the electrolyte is not excessive, e.g., less than 250 mm. Hg. It is preferred to operate at temperatures such that the vapor pressure of the electrolyte is less than about 50 mm. Hg. As will be understood by those skilled in the art, the vapor pressure of the electrolyte at a given temperature will be dependent upon the composition of said electrolyte. It is well known that additives such as potassium fluoride cause the vapor pressure of liquid hydrogen fluoride to be decreased an unusually great amount. A presently preferred range of temperature is from about 60 to about 105° C. Higher temperatures sometimes tend to promote fragmentation of the product molecules.

Pressures substantially above or below atmospheric can be employed if desired, depending upon the vapor pressure of the electrolyte as discussed above. In all instances, the cell pressure will be sufficient to maintain the electrolyte in liquid phase. Generally speaking, the process of the invention is conveniently carried out at substantially atmospheric pressure. It should be pointed out that a valuable feature of the invention is that the operating condition of temperature and pressures within the limitations discussed above are not critical and are essentially independent of the type of feed employed in the process.

An outstanding advantage of the invention is that the process does not depend upon the solubility of the feed material in the electrolyte. Vigorous agitation or the use of chemical solubilizers, such as required in some prior art processes, are not necessary. In some instances, however, a mild stirring or agitation for purposes of aiding in temperature control is beneficial. It should be particularly noted that the porous anode is not merely a sparger for introducing the feedstock into the electrolyte as in some electrolytic processes of the prior art. In the preferred manner of practicing our invention, we avoid contact between the main body of the electrolyte and the feedstock and/or fluorinated products.

For purposes of efficiency and economy, the rate of direct current flow through the cell is maintained at a rate which will give the highest practical current densities for the electrodes employed. Generaly speaking, the current density will be high enough so that anodes of moderate size can be employed, yet low enough so that said anode is not corroded or disintegrated under the given current flow. Current densities within the range of from 30 to 1000, or more, preferably 50 to 500 milliamps per square centimeter of anode geometric surface area can be used. Current densities less than 30 milliamps per square centimeter of anode geometric surface area are not practical because the rate of fluorination is too slow. The voltage which is employed will vary depending upon the particular cell configuration employed and the current density employed. In all cases, under normal operating conditions, however, the cell voltage or potential will be less than that required to evolve or generate free or elemental fluorine. Voltages in the range of from 4 to 12 volts are typical. The maximum voltage will not exceed 20 volts per unit cell. Thus, as a guide in practicing the invention, voltages in the range of 4 to 20 volts per unit cell can be used.

As used herein and in the claims, unless otherwise specified, the term "anode geometric surface" refers to the outer geometric surface area of the anode which is exposed to electrolyte and does not include the pore surfaces. For example, in FIG. 1 the anode geometric surface is the vertical cylindrical side wall.

The feed rate of the fluorinatable material being introduced through the pores of the anode is an important process variable in that, for a given current flow or current density, the feed rate controls the degree of conversion. Similarly, for a given feed rate, the amount of current flow or current density can be employed to control the degree of conversion. Feed rates which can be employed in the practice of the invention will preferably be in the range of from 0.5 to 10 milliliters per minute per square centimeter of anode geometric surface area. With the higher feed rates, higher current density and current rates are employed. Since the anode can have a wide variety of geometrical shapes, which will affect the geometrical surface area, a sometimes more useful way of expressing the feed rate is in terms of anode cross-sectional area (taken perpendicular to the direction of flow). For the anode employed in several of the examples and illustrated in FIG. 1, the above range would be 25 to 500 milliliters per minute per square centimeter of cross-sectional area.

The actual feed rate employed will depend upon the type of carbon used in fabricating the porous anode as well as several other factors including the nature of the feedstock, the conversion desired, current density, etc., because all these factors are interrelated and a change in one will affect the others. In all instances, however, the feed rate will be such that the feedstock is passed into the pores of the anode, and into contact with the fluorinating species therein, at a flow rate such that the inlet pressure of said feedstock into said pores is essentially less than the sum of (a) the hydrostatic pressure of the electrolyte at the level of entry of the feedstock into said pores and (b) the exit pressure of any unreacted feedstock and fluorinated products from said pores into the electrolyte. Said exit pressure is defined as the pressure required to form a bubble on the outer surface of the anode and break said bubble away from said surface. Said exit pressure is independent of hydrostatic pressure. Under these flow rate conditions there is established a pressure balance between the feedstock entering the pores of the anode from one direction and electrolyte attempting to enter the pores from another and opposing direction. This pressure balance provides an important and distinguishing feature of our invention in that essentially none of the feed leaves the anode to form bubbles which escape into the main body of the electrolyte. Essentially all of the feedstock travels within the carbon anode via the pores therein until it reaches a collection zone within the anode from which it is removed via a conduit, or until it exits from the anode, preferably at a point above the surface of the electrolyte.

The more permeable carbons will permit higher flow rates than the less permeable carbons. Any suitable porous carbon which will permit operation within the limits of the above-described pressure balance can be employed in the practice of the invention. Thus, broadly speaking, porous carbons having a permeability within the range of from 0.5 to 75 darcys and average pore diameters within the range of from 1 to 150 microns can be employed in the practice of the invention. Generally speaking, carbons having a permeability within the range of from about 2 to about 30 darcys and an average pore diameter within the range of from about 20 to about 75 microns are preferred.

Similarly, anode shapes, anode dimensions, and manner of disposal of the anode in the electrolyte will also have a bearing on the flow rate. Thus, owing to the many different types of carbon which can be employed and the almost infinite number of combinations of anode shapes, dimensions, and methods of disposal of anode in the electrolyte, there are no really fixed numerical limits on the flow rates which can be used in the practice of the invention. Broadly speaking, the upper limit on the flow rate will be that at which "breakout" of feedstock and/or fluorinated product begins in a region other than within the top portion of the anode when operating with a totally immersed anode as in FIG. 1 or along the immersed portion of the anode when the anode is provided with an internal collection zone as in FIG. 2 or the top of the anode is above the surface of the electrolyte as in FIG. 4. Herein and in the claims, unless otherwise specified, "breakout" is defined as the formation of bubbles of feedstock and/or fluorinated product on the outer immersed surface of the anode with subsequent detachment of said bubbles wherein they pass into the main body of the electrolyte. Broadly speaking, the lower limit of the feed rate will be determined by the requirement to supply the minimum amount of feedstock sufficient to furnish enough hydrogen values to prevent evolution of free fluorine. As a practical guide to those skilled in the art who desire to practice the invention, the flow rates can be within the range of from 3 to 600, preferably 12 to 240, cc. per minute per square centimeter of cross-sectional area (taken perpendicular to the direction of flow).

The above-described pressure balance will permit some invasion of the pores of the anode by the hydrogen fluoride electrolyte. The amount of said invasion will depend upon the inlet pressure of the feedstock and the pore size. The larger size pores are more readily invaded. We have found that porous carbon anodes as described herein can be successfully operated when up to 40 to 50 percent of the pores have been invaded by liquid HF electrolyte.

The degree of conversion significantly affects the type or identity of the predominating products. Low degrees of conversion favor the production of partially fluorinated products whereas high degrees of conversion produce more highly fluorinated products. An important feature of our invention is that the residence time of the feed materials in the cell is uniform and very low. While the actual residence time of the feed and fluorinated product in the reaction zone of the cell is difficult to determine, it appears the maximum residence time is in the order of 0.01 to 2 minutes, probably less than 1 minute. Preferably, the residence time within the pores of the anode will be in the range of from 0.2 to 2 minutes, more preferably within the range of 0.25 to 0.5 minute. The actual residence time will depend upon the amount of invasion of the anode pores by the electrolyte. This is in marked contrast to the prior art processes wherein the feed material is dissolved in the electrolyte and the resulting solution then electrolyzed over a period of hours. Consequently, controlling the conversion in the process of our invention makes possible a much closer control of the products of the invention as compared to said prior art processes whose "batch type" operation tends to produce excessive quantities of fragmented, completely fluorinated products. Thus, in the practice of the invention when it is desired to utilize a specific feed for the purpose of obtaining a predominantly specific product, or a predominating range of products, a porous anode is chosen which will be capable of operating at high current densities and thus suitable for passing the required quantity of feed into and within the pores thereof at a rate which will utilize its porosity to maximum advantage.

In the practice of the invention, the feed material and the products obtained therefrom are retained in the cell for a period of time which is generally less than one minute. The fluorinated products and the unconverted feed are passed from the cell and then are subjected to conventional separation techniques such as fractionation, solvent extraction, adsorption, and the like, for separation of unconverted feed and reaction products. Unconverted or insufficiently converted feed materials can be recycled to the cell for the production of more highly fluorinated products, if desired. Perfluorinated products, or other products which have been too highly fluorinated, can be burned to recover hydrogen fluoride which can be returned to the cell, if desired. By-product hydrogen can be burned to provide heat energy or can be utilized in hydrogen-consuming processes such as hydrogenation, etc.

It will be noted that in the process of the invention the reactant fluorinatable compound or substance is introduced into the pores of a porous anode and the fluorination of said reactant is carried out within said pores. While it is not intended to limit the invention by any theory as to its reaction mechanism, it is presently believed that fluorine-containing anion from the HF electrolyte migrates into the pores of the porous anode where it discharges an electron and forms a free radical intermediate. It is believed this free radical adsorbs to the surface of the anode pores forming a surface complex which is the actual fluorinating species capable of fluorinating said reactant. We have established that free or elemental fluorine is not the fluorinating species. This is shown by the fact that in the normal operation of the process of the invention no free or elemental fluorine can be detected in the cell or in the reaction products.

Such a system wherein the fluorination takes place within the pores of the anode differs markedly from the systems of the prior art wherein (a) the reactant to be fluorinated is dissolved or emulsified to some extent in the electrolyte, or (b) said reactant is fed through a porous or perforated sparger into the electrolyte. In such prior art systems fluorination occurs in the electrolyte and the solubility of the reactant, usually very low or of only limited solubility at best, has a marked effect upon the reaction and limits the maximum rate of exhaustion or utilization of the fluorinating species or complex and thus limits the amount of current density which can be employed in the process. This limit is not present in the present invention because the reactant feedstock is continually transported to the fluorinating species within the pores of the anode and solubility of the feedstock in the electrolyte is not a controlling factor. This makes possible the utilization of much higher current densities with a resultant great increase in overall efficiency of the process. This increased efficiency is reflected in the unusually high amounts of fluorinated product produced per kilowatt hour, the unusually high amount of fluorine introduced into said product (converted feedstock) per kilowatt hour, and the unusually high amount of fluorine introduced into the product (converted feedstock) per square centimeter of anode surface per hour, as illustrated by the examples given hereinafter. Other outstanding advantages of our process include a marked reduction in carbon chain cleavage and corresponding reduction in the amount of cleavage products, and a preponderance of the more valuable partially fluorinated products.

Based on said examples, it is within the scope of the invention to introduce into the converted feedstock (fluorinated product) an amount of fluorine within the range of from 0.01 to 0.7 gram per square centimeter of anode geometric surface per hour, or more. When operating in accordance with the preferred conditions set forth herein, the amount of fluorine which can be introduced into said converted feedstock is within the range of from 0.02 to 0.4 gram per square centimeter of anode geometric surface per hour. The above amounts of introduced fluorine which can be obtained by the process of the invention are far greater than can be obtained by processes of the prior art.

Stated in terms of electrical power, it is within the scope of the invention to introduce into the converted feedstock (fluorinated product) an amount of fluorine within the range of from 15 to 1000 grams per kilowatt hour, or more. When operating in accordance with the preferred conditions set forth herein, the amount of fluorine which can be introduced into said converted feedstock is within the range of from 30 to 590 grams per kilowatt hour. The above amounts of introduced fluorine which can be obtained by the process of the invention represent a much greater efficiency in use of electrical power than is obtained by processes of the prior art.

An outstanding advantage of the process of the invention is the comparative freedom of the process from polarization difficulties as compared to prior art processes utilizing hydrogen fluoride electrolytes. This contributes to and makes possible the above-described great increase in overall efficiency of the invention process. Polarization is sometimes referred to as the anodic effect. When this happens the ohmic resistance of the cell increases markedly. In severe cases the cell for all practical purposes becomes nonconductive and inoperable. Polarization is aggravated by more than trace amounts of water in the hydrogen fluoride electrolyte. Breakout of the feedstock from the anode into the main body of the electrolyte, e.g., when the feedstock is passed through the pores of the anode and bubbles into the electrolyte as in some prior art processes, increases polarization. When polarization does occur, infrequently, in the operation of our process, we have found the cell can be restored to operation by applying high voltage (about 80 volts) thereto for a short period of time, usually about 2 to 10 minutes. Another way of overcoming polarization is to reverse the current for a short period of time.

In prior art processes utilizing hydrogen fluoride electrolytes and which depend upon the solubility of the reactant feed material in the electrolyte, the maximum amount of current density which can be employed without excessive anode corrosion and product degradation occurring is in the order of 20 milliamps per square centimeter of anode surface. In other prior art processes, attempts have been made to overcome lack of solubility of the feed in the electrolyte by employing a porous or perforated anode as a sparger to supply feed continuously to the electrolyte. In these processes extensive amounts of cleavage products and other by-products are formed. In contrast, in the process of our invention the preferred minimum current density is 50 milliamps per square centimeter of anode surface. In our process, even when employing these high current densities, essentially no cleavage products are produced, even when an unsaturated feed such as ethylene is used.

Figure 1:
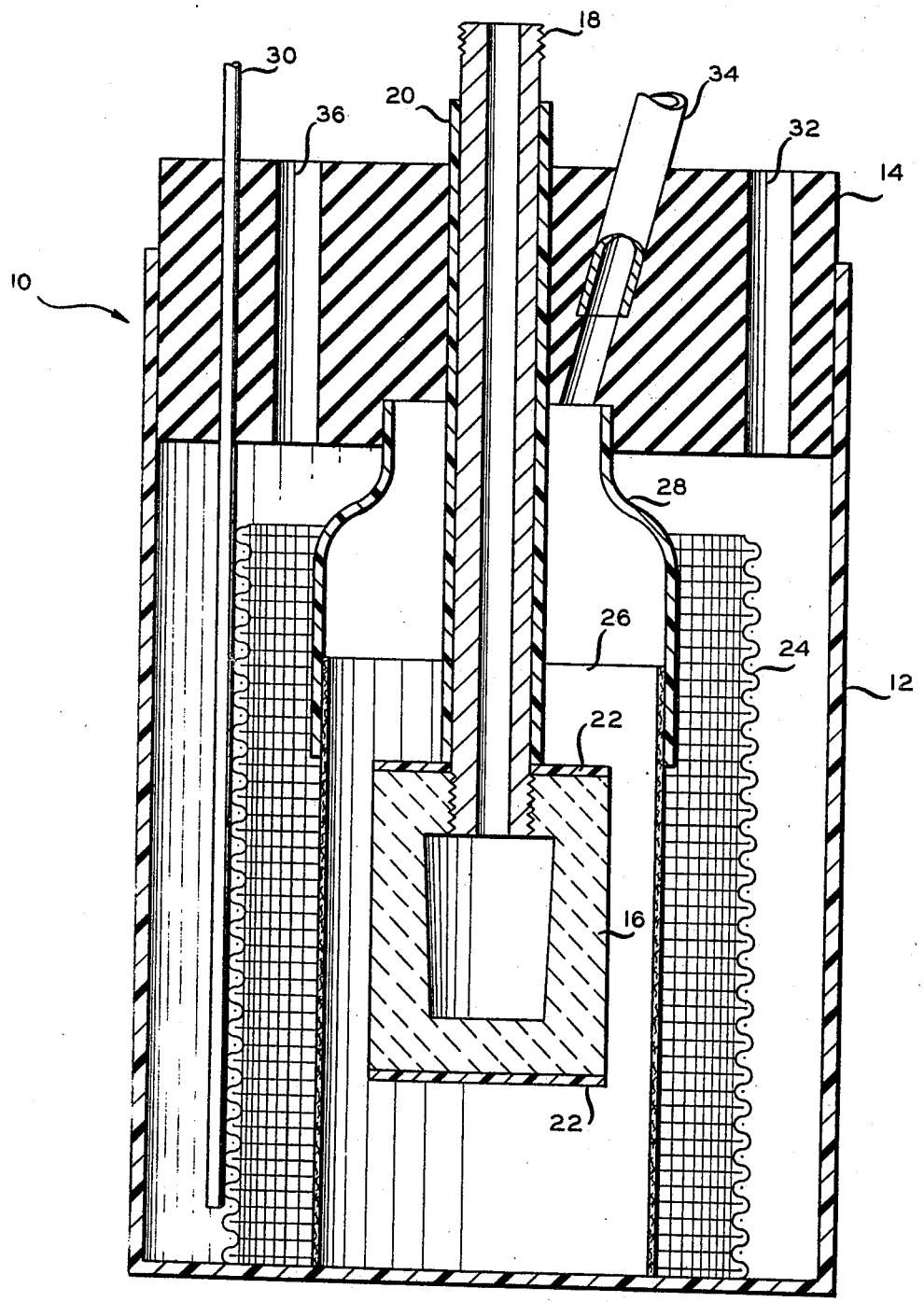
FIG. 1 is a view in cross section illustrating one form of electrolysis cell which can be employed in the practice of the invention.

Referring now to the drawings, the invention will be more fully explained. In FIG. 1, there is illustrated an electrolysis cell designated generally by the reference numeral 10. Said cell comprises a generally cylindrical container 12 which is closed at the bottom and open at the top. Said container can be fabricated from any suitable material which is resistant to the electrolyte employed therein. A removable top closure member 14 is adapted to cooperatively engage the upper portion of said container and close same. As here shown, said closure member comprises a rubber stopper which has been inserted into the upper portion of the container. It will be understood that any other suitable type of closure member which engages the upper edges or upper portion of the container, e.g., a threaded closure member can be employed. A first opening is centrally disposed in and extends through said closure member, as shown. While said opening is here shown as being centrally disposed for convenience, it will be understood it is not essential that said opening be centrally disposed. A first conduit 18, conveniently fabricated from stainless steel, mild steel, or other conductive material, extends through said first opening into the interior of said container 12. A suitable insulation 20, such as Teflon tape, is disposed around the outer wall of said first conduit and between same and the wall of said first opening. An anode 16 comprising a cylinder of porous carbon, closed at one end thereof, is connected at the other end to the end of said conduit 18 which extends into said container. Preferably, the top and bottom surfaces of said carbon cylinder are sealed with a suitable plastic or other resistant cement 22. In the cell illustrated in FIG. 1, said anode 16 has an outside diameter of about one inch. The remainder of the elements of said cell are, in general, proportional in size. These dimensions are given by way of example only and are not limiting on the invention. Any suitable type of porous carbon from among the several grades commercially available can be employed for fabricating said anode. One presently preferred type of porous carbon is known commercially as Stackpole 139 carbon. This carbon has a pore volume of about 0.2 to about 0.3 cc. per gram with the pore diameters ranging from 0.1 to 10 microns. Another suitable porous carbon is that known commercially as National Carbon Grade 60 which has a pore volume of about 0.3 to about 0.5 cc. per gram with the pores ranging from 10 to 60 microns in diameter. The actual values of said pore volumes will depend upon the specific method employed for determining same. Thus, preferred porous carbons for fabricating anodes employed in the practice of the invention include those having a pore volume within the range of about 0.2 to about 0.5 cc. per gram with the pores ranging from 0.1 to 60 microns in diameter.

As shown, a recess is provided in the bottom wall of said closure member 14 and surrounds said first opening in said bottom wall. A substantially cylindrical diaphragm holder 28 is positioned with the upper end thereof mounted in said recess and the lower end thereof extending downwardly around said first conduit 18. A substantially cylindrical diaphragm 26 is positioned with its upper end mounted in said diaphragm holder 28 and its lower end extending downwardly around said anode 16. Said diaphragm can be fabricated from any suitable ion permeable membrane or divider material. As here shown, said diaphragm has been fabricated from an acid-washed filter paper. Other diaphragm materials which can be employed include grids or screens made of various metals such as nickel or nickel alloys, etc. The use of a diaphragm such as diaphragm 26 is not essential in the practice of the invention but is sometimes preferred in that said diaphragm divides the interior of the container into an anode compartment and a cathode compartment. The division of said container into said compartments separates the anode products from the hydrogen produced at the cathode and facilitates the recovery and separation of said anode products. While said diaphragm is shown as extending to the bottom of said container 12, it will be understood there is no connection therebetween and liquid electrolyte is free to flow between said compartments. Also, while not shown, it will be understood that the bottom or bottom portion of said container can be provided with an outlet conduit.

A second opening 34 is provided in and extends through said closure member 14 into communication with said anode compartment. This opening provides means for withdrawing the anode products from the cell. As shown, a conduit has been inserted into said opening. It will be understood that any suitable type of conduit means for withdrawing said anode products can be employed. A tubular thermocouple well 30 extends through said closure member 14 into said cathode compartment. A substantially cylindrical cathode 24, here shown to be fabricated from a metallic mesh or screen, is disposed in said cathode compartment around said diaphragm 26 and is maintained in position by being attached to said thermocouple well 30 (as by silver soldering). Said thermocouple well 30 thus also serves as the means for supporting and for connecting said cathode to a suitable source of direct current. A third opening 36 extends through said closure member 14 into communication with said cathode compartment. Said third opening provides conduit means for removing hydrogen produced at the cathode from the cell. It will be understood that any suitable type of conduit means can be inserted into said opening 36. A fourth opening 32 extends through said closure member 14 into communication with said cathode compartment and comprises conduit means for introducing electrolyte into the cell. It will be understood that any suitable type of conduit means can be inserted in said opening 32. It will also be understood to be within the scope of the invention, as when no diaphragm is employed, to provide the cell with only one opening such as 32, 34, or 36 and to remove all of the cell effluents through said one opening.

In the operation of the cell illustrated in FIG. 1, said cell is first charged with a suitable electrolyte such as essentially anhydrous liquid hydrogen fluoride and potassium fluoride in a mole ratio of KF·2HF. In the event said electrolyte contains traces of water, it is preferred to first electrolyze the electrolyte by connecting said first conduit 18 and said thermocouple well 30 to a suitable source of direct current and passing said current through the cell for a period of time sufficient to remove essentially all of the water. A fluorinatable organic compound, e.g., a gaseous hydrocarbon, is then passed through conduit 18 into the interior of anode 16, and then passed into the pores of said anode and into contact with the fluorinating species therein. Fluorination occurs within the pores of said anode. As shown by examples given hereinafter, the unreacted feedstock and fluorinated products move upward through the connecting pores of the anode and exit from said anode adjacent the top thereof where the hydrostatic pressure of the electrolyte is least. The fluorinated products enter the space above the electrolyte and are withdrawn from the anode compartment via the conduit inserted into opening 34. Hydrogen is withdrawn from the cathode compartment via opening 36. The effluents from the cell will contain some HF, depending upon the temperature at which the cell is operated, and this HF can be removed from said effluents by scrubbing with a suitable scrubbing agent such as Ascarite (sodium hydroxide supported on asbestos), or if recovery of the HF is desired the scrubbing agent can be sodium fluoride or potassium fluoride. In many instances, said HF can be separated from the cell effluents by fractional distillation. Temperature control of the cell contents is maintained by placing the cell in an oil bath provided with heat exchange means.

In the above description, the top of anode 16 has been positioned below the electrolyte level in the cell. If desired, the anode can be raised so that the top portion thereof is above the electrolyte level, and fluorinated product and any remaining unfluorinated feedstock are passed from within the pores of the anode directly into the space above the surface of the electrolyte within the cell.

While the cell in FIG. 1 has been illustrated as being substantially cylindrical in shape, any other suitable configuration can be employed. Also, it is within the scope of the invention to employ any other suitable electrolysis cell incorporating the general features of the above-described cell of FIG. 1. It is also within the scope of the invention to employ anodes having a configuration other than cylindrical, e.g., rectangular or triangular, and a disposition within the cell other than vertical, e.g., horizontal.

Figures 2, 4:
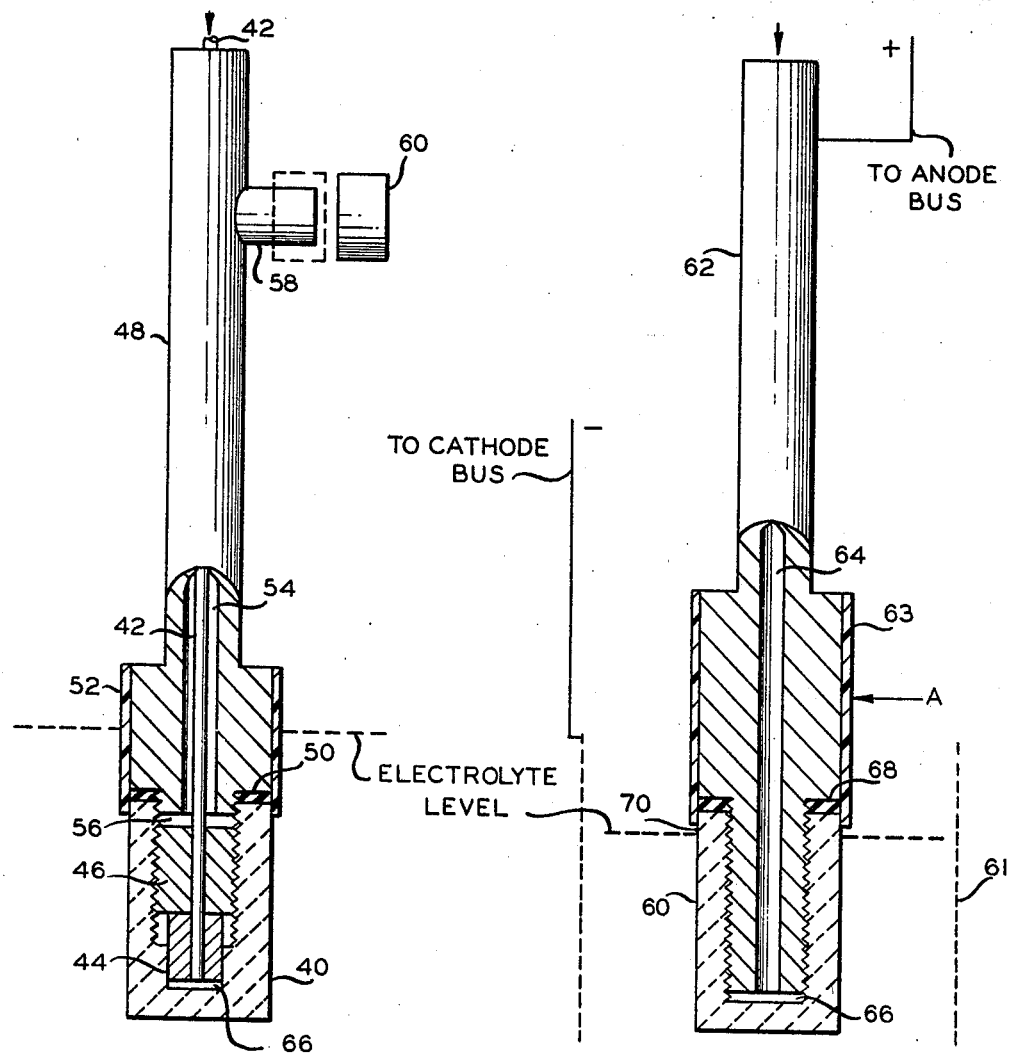
FIG. 2 is a view in cross section illustrating one form of anode assembly which can be employed in the practice of the invention.
FIG. 4 is a schematic illustration of another cell arrangement and anode assembly which can be employed in the practice of the invention.

The anode assembly of FIG. 2 is described hereinafter in connection with Example X.

Figure 3:
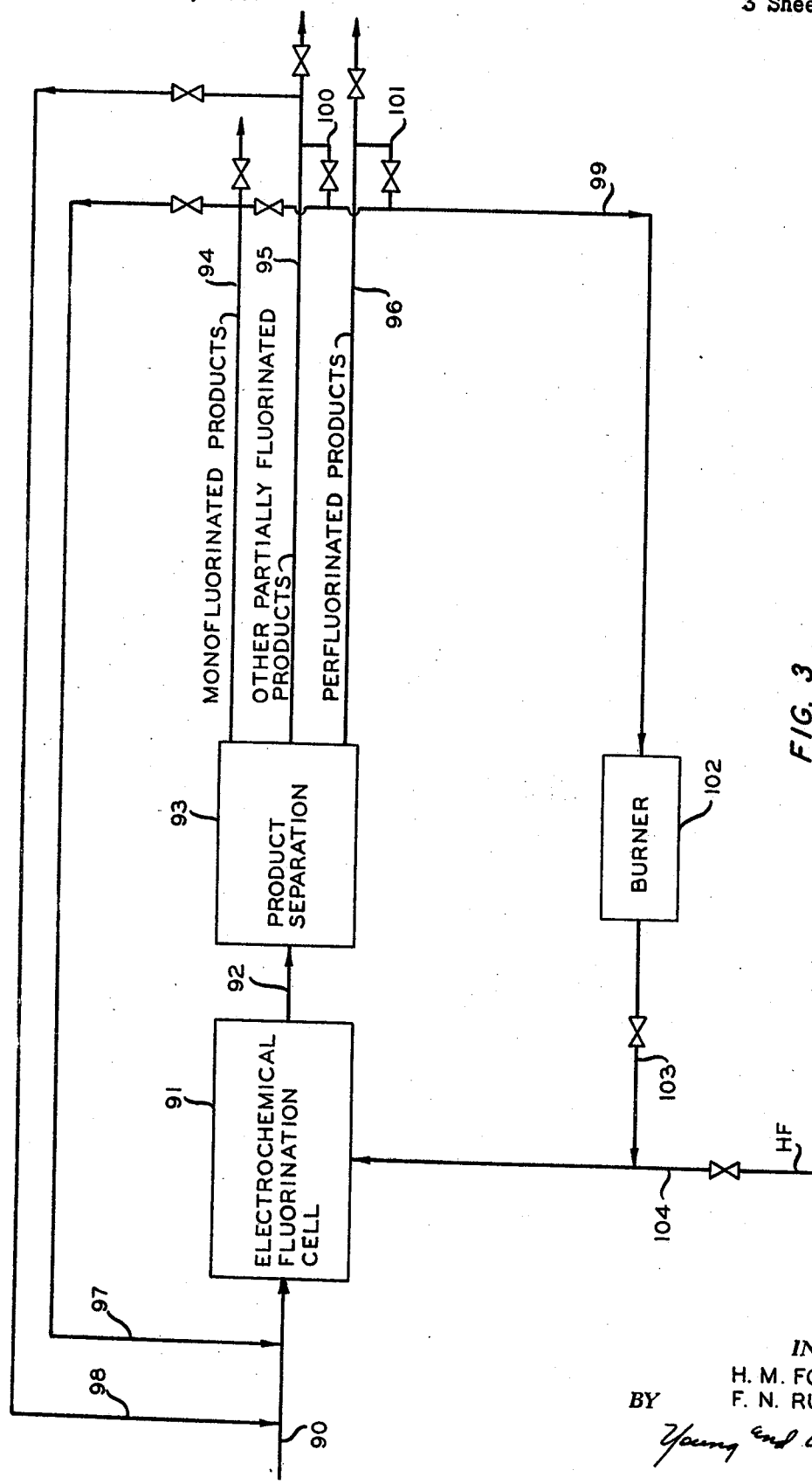
FIG. 3 is a diagrammatic flow sheet illustrating various processing embodiments of the invention.

In the flow sheet of FIG. 3, an organic compound to be fluorinated is introduced via conduit 90 into electrochemical fluorination cell 91. Said cell 91 can be of any suitable type, such as those described in connection with the other drawings. In said cell said organic compound is fluorinated as described herein and cell effluent comprising fluorinated products and unreacted feed material is withdrawn from the cell via conduit 92 and passed into product separation zone 93. Said product separation zone 93 can comprise any suitable means for effecting the desired separation between the products and the unreacted feed material, e.g., fractional distillation, solvent extraction, adsorption means, etc. As discussed herein, the fluorinated products can comprise monofluorinated products, other partially fluorinated products, and perfluorinated products. As used herein and in the claims, unless otherwise specified, the term "perfluorinated" refers to a material wherein all the potential fluorinatable valence bonds have been fluorinated, e.g., hexafluoroethane, $C_2F_6$. Said perfluorinated products can be withdrawn from separation means 93 via conduit 96 as one product of the process. Monofluorinated products can be withdrawn via conduit 94 as a product of the process, or if desired recycled via conduit 97 to conduit 90 for further fluorination in said cell 91. Similarly, the other partially fluorinated products can be withdrawn via conduit 95 as products of the process, or recycled to cell 91 via conduits 98 and 90. Or, if desired, said partially fluorinated products and said perfluorinated products can be passed via conduits 100 and 101, respectively, into conduit 99, and then into burner and hydrogen fluoride recovery means 102. In said burner 102 said partially fluorinated and said perfluorinated products are burned to recover hydrogen fluoride which can then be passed via conduits 103 and 104 to cell 91. Said burner and HF recovery means can comprise any suitable burner for burning said fluorinated products, and any suitable means for recovering HF from the resulting combustion gases. Make-up hydrogen fluoride, together with any suitable conductivity additive, can be introduced into said cell 91 via conduit 104. Although not shown in the drawing, it will be understood that unreacted feed materials can be withdrawn from said product separation zone 93 and recycled to cell 91 for fluorination.

Figure 6:
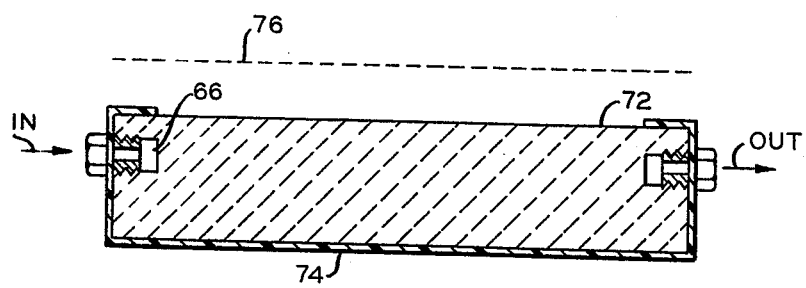
FIG. 6 is a view in cross section along the line 6—6 of FIG. 5.
Figure 5:
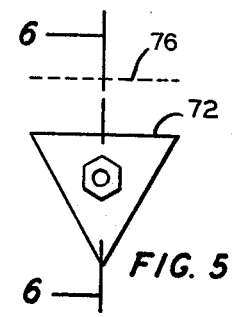
FIG. 5 is a schematic illustration of another cell arrangement and anode assembly which can be employed in the practice of the invention.

FIG. 4 is described hereinafter in connection with Example XI. FIGS. 5 and 6 are discussed hereinafter in connection with Example XII.

The following examples will serve to further illustrate the invention.

EXAMPLE I

A series of runs was carried out for the electrochemical fluorination of ethane. The fluorination was carried out in a cell essentially like that illustrated in FIG. 1. The porous anode was formed of the above-described Stackpole 139 porous carbon, had a side wall thickness of 0.635 centimeter, and had an outside vertical surface area of 30 square centimeters. The bottom and top surfaces were coated with a resistant cement to restrict the exposed geometric surface to the vertical portion only. The cathode was formed of a nickel screen (8 mesh). The electrolyte employed was essentially anhydrous liquid hydrogen fluoride containing potassium fluoride as conductivity additive in the molar ratio of $KF \cdot 2HF$. Said runs were carried out at a temperature within the range of 72 to 95° C. The cell pressure was essentially atmospheric. The cell terminal voltage was in the range of 6 to 8 volts. The feedstock was introduced into the pores of the anode at rates such that the breakout of the unreacted feedstock and/or fluorinated feedstock from within the pores of the anode into the main body of the electrolyte was essentially confined to the top portion of the anode immediately adjacent the top seal 22, i.e., within the upper 0.25 inch of the anode, or less. The cell effluent was analyzed by conventional means such as gas-liquid chromatography and mass spectrography. Other operating conditions and the results of the runs in terms of type and quality of products obtained are given in Table I below.

TABLE I.—ELECTROCHEMICAL FLUORINATION OF ETHANE

| | Run number | | | | | |
|---|---|---|---|---|---|---|
| | 1 | 2 | 3 | 4 | 5 | 6 |
| Current density, ma./cm.² | 100 | 100 | 100 | 166 | 233 | 300 |
| Ethane feed rate, liters/hr | 2.85 | 7.88 | 1.60 | 7.95 | 7.92 | 8.0 |
| Ethane feed rate, ml./min./cm.² of anode ¹ | 1.58 | 4.38 | 0.89 | 4.42 | 4.40 | 4.44 |
| Ethane feed rate, ml./min./cm.² of anode ² | 80.6 | 223.4 | 45.4 | 225.4 | 224.4 | 226.4 |
| Ethane conversion, mole percent | 23.0 | 9.9 | 29.7 | 15.8 | 18.1 | 22 |
| Distribution of products, mole percent: | | | | | | |
| Ethyl fluoride | 64.1 | 74.9 | 46.9 | 67.6 | 55.6 | 45.9 |
| 1,1-difluoroethane | 9.6 | 7.2 | 9.8 | 8.1 | 11.1 | 12.4 |
| 1,2-difluoroethane | 11.5 | 7.9 | 11.2 | 10.1 | 13.8 | 14.7 |
| 1,1,1-trifluoroethane | 0.9 | 0.6 | 1.6 | 0.8 | 1.4 | 1.9 |
| 1,1,2-trifluoroethane | 4.8 | 2.9 | 7.8 | 4.3 | 7.0 | 10.8 |
| 1,1,2,2-tetrafluoroethane | 1.1 | 0.9 | 3.4 | 1.3 | 2.3 | 3.1 |
| 1,1,1,2-tetrafluoroethane | 0.8 | 0.6 | 2.0 | 0.9 | 1.5 | 1.9 |
| Pentafluoroethane | 1.3 | 1.2 | 4.1 | 1.7 | 2.5 | 2.7 |
| Hexafluoroethane | 3.9 | 1.9 | 10.1 | 2.9 | 2.9 | 3.3 |
| C₄ fluorides | 1.1 | 1.7 | 2.1 | 1.8 | 1.3 | 2.6 |
| C₁ fluorides | 0.9 | 0.2 | 1.0 | 0.5 | 0.6 | 0.7 |
| | 100.0 | 100.0 | 100.0 | 100.0 | 100.0 | 100.0 |
| Current efficiency to fluorinated products, percent | 87 | 90 | 87 | 94 | 90 | 94 |
| Grams of fluorine introduced into products: | | | | | | |
| Per cm² of anode ¹ per hour | 0.031 | 0.032 | 0.031 | 0.055 | 0.075 | 0.10 |
| Per kwh | 45.6 | 48.3 | 48.0 | 47.8 | 43.4 | 42.3 |
| Gram moles products/kwh | 1.43 | 1.73 | 1.10 | 1.62 | 1.25 | 1.10 |

¹ Geometric surface area.
² Cross-sectional area.

The data in the above Table I show that a normally gaseous hydrocarbon such as ethane can be readily fluorinated in vapor phase and converted to fluorinated products with a high current efficiency. It should also be noted that upwards of 85 to 90 percent of the products in each of the runs were partially fluorinated products. The production of significant amounts of 1,2-difluoroethane, a product difficult to prepare by any other known process, is noteworthy. Said 1,2-difluoroethane is a valuable charge stock for the production of vinyl fluoride by dehydrohalogenation, or the production of 1,2-difluoroethylene by dehydrogenation. Attention is also invited to the exceptionally high yields of ethyl fluoride. Said ethyl fluoride is a good charge stock for the production of 1,2- and 1,1-difluoroethane, either by recycle or by charging to an additional fluorination cell. Attention is also invited to the small amounts of cleavage products, e.g., C₁ fluorides, even at the high conversions of feedstock.

EXAMPLE II

Another series of runs was made in which ethylene was electrochemically fluorinated. These runs were carried out in essentially the same manner, in essentially the same apparatus, and using the same type of electrolyte as employed in Example I. The runs were carried out at substantially atmospheric pressure, a temperature in the range of 70 to 90° C., and employing a cell terminal voltage of 7 to 9 volts. Other operating conditions and the results of the runs in terms of type and quantity of products obtained are set forth in Table II below.

Again, it should be noted that the products obtained are predominantly partially fluorinated products.

TABLE II.—ELECTROCHEMICAL FLUORINATION OF ETHYLENE

| | Run number | | | | |
|---|---|---|---|---|---|
| | 1 | 2 | 3 | 4 | 5 |
| Current density ma./cm.$^2$ | 100 | 100 | 166 | 166 | 100 |
| Ethylene feed rate liters/hr | 4.13 | 8.39 | 2.06 | 7.01 | 2.11 |
| Ethylene feed rate ml./min./cm.$^2$ of anode [1] | 2.29 | 4.66 | 1.14 | 3.89 | 1.17 |
| Ethylene feed rate ml./min./cm.$^2$ of anode [2] | 116.8 | 237.7 | 58.1 | 198.4 | 59.7 |
| Ethylene conversion mole percent | 12.5 | 7.5 | 34.5 | 12.9 | 22.6 |
| Cell effluent rate moles/hr | 0.176 | 0.369 | 0.082 | 0.308 | 0.0897 |
| Distribution of products mole percent: | | | | | |
| Vinyl fluoride | 6.5 | 10.2 | 4.7 | 10.5 | 6.1 |
| Ethyl fluoride | 2.3 | 3.6 | 1.6 | 3.3 | 2.1 |
| 1,1-difluoroethane | 0.5 | 0.7 | 0.6 | 0.7 | 0.8 |
| 1,2-difluoroethane | 22.5 | 26.6 | 20.7 | 19.9 | 22.6 |
| 1,1,2-trifluoroethane | 19.5 | 18.2 | 17.0 | 17.4 | 17.1 |
| 1,1,2,2-tetrafluoroethane | 10.6 | 8.6 | 9.8 | 9.1 | 9.5 |
| 1,1,1,2-tetrafluoroethane | 4.9 | 3.8 | 4.3 | 4.6 | 3.9 |
| Pentafluoroethane | 11.7 | 7.7 | 13.0 | 10.9 | 10.1 |
| Hexafluoroethane | 8.7 | 6.0 | 18.1 | 13.0 | 14.8 |
| C$_4$ fluorides | 11.7 | 13.9 | 9.8 | 10.3 | 12.9 |
| C$_1$ fluorides | 1.1 | 0.7 | 0.4 | 0.3 | 0.1 |
| | 100.0 | 100.0 | 100.0 | 100.0 | 100.0 |
| Current efficiency to fluorinated products, percent | 95 | 99.6 | 80 | 100 | 89 |
| Grams of fluorine introduced into products: | | | | | |
| Per cm.$^2$ of anode [1] per hour | 0.048 | 0.051 | 0.065 | 0.082 | 0.043 |
| Per kwh | 63.2 | 68.0 | 46.4 | 59.3 | 50.0 |
| Gram moles of products/kwh | 1.01 | 1.23 | 0.674 | 0.957 | 0.786 |

[1] Geometric surface area.
[2] Cross-sectional area.

The data in the above Table II show that an unsaturated hydrocarbon such as ethylene can be converted to fluorinated products in the electrochemical fluorination process of the invention with a high current efficiency. Upwards of 70 percent of the products obtained are partially fluorinated products. The exceptionally high yield of 1,2-difluoroethane, in the order of twice as much as obtained from ethane in Example I, should be noted. The low yield of ethyl fluoride, as compared with the results obtained in Example I, should also be noted. The small amounts of cleavage products, e.g., C$_1$ fluorides, even at the high conversions of feedstock should also be noted.

EXAMPLE III

Another series of runs was carried out in which methane was electrochemically fluorinated in accordance with the process of the invention. These runs were carried out in essentially the same manner, employing essentially the same apparatus, and employing the same type of electrolyte as in the runs of Example I. Said runs were carried out at substantially atmospheric pressure, a temperature of from 74 to 76° C., and a cell terminal voltage of about 6.8 volts. The results of said runs in terms of the type and quantity of products obtained, together with other operating conditions, are set forth in Table III below.

TABLE III.—ELECTROCHEMICAL FLUORINATION OF METHANE

| | Run number | | | | |
|---|---|---|---|---|---|
| | 1 | 2 | 3 | 4 | 5 |
| Current density, ma./cm.$^2$ | 100 | 167 | 100 | 167 | 233 |
| Methane conversion, percent | 25.78 | 34.58 | 12.36 | 19.35 | 23.52 |
| Methane feed rate, liters/hr | 4.31 | 4.35 | 8.79 | 8.74 | 8.71 |
| Methane feed rate, ml./min./cm.$^2$ of anode [3] | 2.39 | 2.41 | 4.88 | 4.86 | 4.84 |
| Methane feed rate, ml./min./cm.$^2$ of anode [4] | 121.9 | 122.9 | 248.9 | 247.9 | 246.8 |
| Distribution of products,[1] area percent:[2] | | | | | |
| CFH$_3$ | 66.28 | 51.59 | 68.20 | 61.78 | 53.22 |
| CF$_2$H$_2$ | 16.07 | 23.34 | 14.19 | 18.03 | 22.25 |
| CF$_3$H | 6.61 | 12.12 | 6.71 | 8.77 | 12.80 |
| CF$_4$ | 11.04 | 12.94 | 10.89 | 11.43 | 11.73 |
| | 100.00 | 99.99 | 99.99 | 100.01 | 100.00 |

[1] The cell effluent contained trace amounts of N$_2$, ethane (or CO$_2$), vinyl fluoride, and ethyl fluoride.
[2] The area percent values represent the relationship of the area of the individual peaks for each individual product to the total area under the chromatogram obtained when the cell effluent was analyzed by gas-liquid chromatography. Such values have been found to usually correlate well proportionally with actual weight percent values.
[3] Geometric surface area.
[4] Cross-sectional area.

EXAMPLE IV

Another series of runs was carried out in which isobutane was electrochemically fluorinated in accordance with the process of the invention. These runs were carried out in essentially the same manner, in essentially the same apparatus, and employing the same type of electrolyte as in Example I. Said runs were made at substantially atmospheric pressure, a cell temperature of 70 to 90° C., and a cell terminal voltage of about 6.8 volts. The results of said runs in terms of the type and quantity of products obtained are shown in Table IV below.

TABLE IV.—ELECTROCHEMICAL FLUORINATION OF ISOBUTANE

| | Run number | | |
|---|---|---|---|
| | 1 | 2 | 3 |
| Current density, ma./cm.$^2$ | 66 | 100 | 100 |
| Isobutane feed rate, liters/hr | 5.13 | 5.26 | 4.14 |
| Isobutane feed rate, ml./min./cm.$^2$ anode [2] | 2.85 | 2.92 | 2.30 |
| Isobutane feed rate, ml./min./cm.$^2$ anode [3] | 145.4 | 148.9 | 117.3 |
| Isobutane conversion, percent | 5.7 | 8.2 | 9.8 |
| Distribution of products, area percent:[1] | | | |
| 2-fluoromethylpropane | 8.4 | 7.5 | 7.4 |
| 1-fluoromethylpropane | 65.7 | 59.1 | 57.6 |
| 1-1,difluoromethylpropane | 5.8 | 7.7 | 7.4 |
| 1,2-difluoromethylpropane | 3.1 | 4.5 | 5.3 |
| 1,3-difluoromethylpropane | 15.7 | 18.9 | 19.6 |
| trifluoromethylpropane | 1.3 | 2.3 | 2.7 |
| | 100.0 | 100.0 | 100.0 |

[1] See footnote on Table III.
[2] Geometric surface area.
[3] Cross-sectional area.

The data in the above table show that a branched chain organic compound such as isobutane can be readily and conveniently fluorinated in the process of the invention. Again, it should also be noted that the products obtained are predominantly partially fluorinated products. Attention is also invited to the large yield of 1-fluoromethyl-propane which was obtained.

EXAMPLE V

Another series of runs was carried out in which dichloromethane (methylene chloride) and trichloromethane (chloroform) were fluorinated in accordance with the invention. These runs were carried out in essentially the same manner, in essentially the same apparatus, and employing the same type of electrolyte as used in Example I. Said runs were carried out at substantially atmospheric pressure, a cell temperaturer of 70 to 90° C., and a cell terminal voltage of about 6.8 volts. The results of said runs in terms of the type and quantity of products obtained are shown in Table V below.

TABLE V.—ELECTROCHEMICAL FLUORINATION OF CHLOROFORM AND METHYLENE CHLORIDE

| Run number | Chloroform | | | Methylene chloride | |
|---|---|---|---|---|---|
| | 1 | 2 | 3 | 4 [2] | 5 [2] |
| Current density, ma./cm.[2] | 66 | 133 | 66 | 100 | 100 |
| Feed rate, liters/hr | 1.75 | 1.75 | 1.9 | [4] 5.7 | [4] 2.5 |
| Feed rate, ml./min./cm.[2] anode [3] | 0.97 | 0.97 | 1.06 | 3.17 | 1.39 |
| Feed rate, ml./min./cm.[2] anode [5] | 49.5 | 49.5 | 54.1 | 161.7 | 70.9 |
| Conversion, percent | 31 | 84 | 29 | 15 | 33 |
| Distribution of products, mole percent: | | | | | |
| $CCl_3F$ | 95.4 | 71.2 | 97.0 | 20.5 | 22.6 |
| $CCl_2FH$ | 1.0 | 2.0 | Trace | 24.5 | 20.2 |
| $CCl_2F_2$ | 1.3 | 17.3 | 1.5 | 34.5 | 37.0 |
| $CClF_3$ | Trace | 6.8 | Trace | 20.5 | 20.2 |
| $CF_4$ | Trace | 0.4 | Trace | Trace | Trace |
| $CCl_4$ | 2.3 | 2.3 | 1.5 | Trace | Trace |
| | 100.0 | 100.0 | 100.0 | 100.0 | 100.0 |
| Current efficiency to fluorinated products, percent | [1] 63 | 99.9 | | | |
| Grams of fluorine introduced into products: | | | | | |
| Per cm.[2] of anode [3] per hour | 0.015 | 0.054 | | | |
| Per kwh | 33.1 | 59.5 | | | |
| Gram moles of products per kwh | 1.76 | 2.43 | | | |

[1] Electrolyte contained a few percent of water and $CO_2$ was produced. This reduced the efficiency to fluorinated products.
[2] Product analyses in these runs reported in area percent. See footnote 2 in Table III.
[3] Geometric surface area.
[4] Approximate.
[5] Cross-sectional area.

The results set forth in the above Table V show that the electrochemical process of the invention utilizing chloroform ($CCl_3H$) as the feedstock is capable of producing trichlorofluoromethane, known commercially as Freon 11, with a very high degree of selectivity. These results were surprising and unexpected in view of the results obtained with the adjacent homologous material, methylene chloride ($CCl_2H_2$). Utilizing methylene chloride as a feed resulted in a mixture of products, similarly as is obtained with other feedstocks.

In many instances, the trichlorofluoromethane product obtained in Runs 1 and 3 could be utilized without further purification.

EXAMPLE VI

Another run was carried out in which an even more highly fluorinated material, 1,1,2-trifluoroethane, was fluorinated in accordance with the invention. This run was carried out in essentially the same manner, using the same type of electrolyte as in Example I, a cell pressure of essentially atmospheric, a cell temperature of from 70 to 90° C., and a cell terminal voltage of about 6.0 volts. The cell employed was essentially the same as in Example I. The results of the run in terms of the type and quantity of products obtained are set forth in Table VI below.

TABLE VI

Electrochemical fluorination of 1,1,2-trifluoroethane

| | |
|---|---|
| Current density, ma./cm.[2] | 100 |
| 1,1,2-trifluoroethane feed rate, liters/hr. | 3.36 |
| 1,1,2-trifluoroethane feed rate, ml./min./cm.[2] anode [1] | 1.87 |
| 1,1,2-trifluoroethane feed rate, ml./min./cm.[2] anode [2] | 95.4 |
| 1,1,2-trifluoroethane conversion, mole percent | 23.5 |
| Distribution of products, mole percent: | |
| 1,1,2,2-tetrafluoroethane | 48.1 |
| 1,1,1,2-tetrafluoroethane | 21.2 |
| Pentafluoroethane | 16.1 |
| Hexafluoroethane | 13.1 |
| $C_4$ fluorides | 1.1 |
| $C_1$ fluorides | 0.4 |
| | 100.0 |
| Additional fluorine introduced into products: | |
| Grams per cm.[2] of anode [1] per hour | 0.031 |
| Grams per kwh. | 51.7 |
| Gram moles of product per kwh. | 1.96 |

[1] Geometric surface area.
[2] Cross-sectional area.

The data given in the above Table VI also demonstrate that partially fluorinated organic compounds can be further fluorinated in accordance with the invention. The small amount of cleavage products, e.g., $C_1$ fluorides, should be noted.

EXAMPLE VII

In a qualitative run it was found that dimethyl ether could be readily and conveniently fluorinated in accordance with the invention. This run was carried out in essentially the same apparatus, in essentially the same manner, and using the same electrolyte as in Example I. Operating conditions were: feed rate, 5.7 liters per hour; temperature, 77° C.; cell pressure, substantially atmospheric; terminal voltage, 7; and current density, 100 milliamps per square centimeter. No quantitative product data were obtained in this run. However, gas-liquid chromatography analysis of the cell effluent showed the presence of the following products:

| | |
|---|---|
| $CH_2FOCH_3$ | Monofluoromethylmethyl ether. |
| $CHF_2OCH_3$ | Difluoromethylmethyl ether. |
| $CH_2FOCH_2F$ | Bis-monofluoromethyl ether. |
| $CH_2FOCHF_2$ | Monofluoromethyldifluoromethyl ether. |
| $CF_3OCH_3$ | Trifluoromethylmethyl ether. |
| $CF_3OCH_2F$ | Trifluoromethylmonofluoromethyl ether. |
| $CHF_2OCHF_2$ | Bis-difluoromethyl ether. |
| $CF_3OCHF_2$ | Trifluoromethyldifluoromethyl ether. |
| $CF_3OCF_3$ | Bis-trifluoromethyl ether. |

EXAMPLE VIII

In another qualitative run it was found that cyclopropane could be readily and conveniently fluorinated in accordance with the invention. This run was carried out in essentially the same apparatus, in essentially the same manner, and using essentially the same electrolyte as in Example I. Operating conditions were: feed rate, 11.3 liters per hour; temperature, 75° C.; cell pressure, substantially atmospheric; terminal voltage, 6.3 volts; and current density, 167 milliamps per square centimeter of anode geometric surface. No quantitative product data were obtained in this run. However, gas-liquid chromatography analysis of the cell effluent showed the presence of the following products: monofluorocyclopropane (major product); 1,3-difluoropropane; 1,2,3-trifluoropropane; 1,2-difluorocyclopropane; and minor amounts of others.

EXAMPLE IX

In another qualitative run it was found that ethyl chloride could be readily and conveniently fluorinated in accordance with the invention. This run was carried out in essentially the same apparatus, in essentially the same manner, and using essentially the same electrolyte as in Example I. Operating conditions were: feed rate, 6.3 liters per hour; cell temperature, 76° C.; cell pressure, substantially atmospheric; terminal voltage, 7.6 volts; and current density, 100 milliamps per square centimeter of anode geometric surface. No quantitative product data were obtained in this run. However, gas-liquid chromatography analysis of the cell effluent showed the presence of the following products: 1-chloro-2-fluoroethane; 1-chloro-1-fluoroethane; 1-chloro-2,2-difluoroethane; 1-chloro-1,2-difluoroethane; and others.

EXAMPLE X

Two series of runs were carried out to demonstrate entry of the feedstock into the pores of a porous anode and the flow of said feedstock within said pores in accordance with the method of the invention.

In these runs an anode assembly essentially like that illustrated in FIG. 2 was employed. Said anode assembly was employed in a cell arrangement substantially like that illustrated in FIG. 1 except that the cell container was provided with a window for observation of the anode. Said anode assembly comprised a porous carbon cylinder 40 having a side wall thickness of about 0.635 centimeter and an outside vertical surface area of 30 square centimeters. The carbon cylinder had an outside diameter of 1 inch and a height of 1.5 inches. A feed tube 42 extended through a metal plug 44 attached to the end of said feed tube 42. Said metal plug 44 was sized to have a press fit with the lower inner circumference of said carbon cylinder, as illustrated. In assembly of the anode, said feed tube and metal plug are first inserted into the carbon cylinder. Said carbon cylinder is then threaded onto the reduced diameter portion 46 of the anode support and current collector 48, by means of the threads shown. The upper end of the carbon cylinder fits against gasket or seal material 50. A Teflon tape seal material 52 coats the lower portion of said metal current collector 48. An annular space 54 is provided around said feed tube 42 within said anode support and current collector 48. Anode inner vent 56 extends from the upper inner surface of anode 40 and into communication with said annular space 54. Said inner vent 56 provides a collection zone for unreacted feedstock and fluorinated products exiting from the pores of the anode. Exit vent 58, in communication with said annular space 54 and said inner vent 56, is provided in the upper portion of said anode support and current collector 48 for withdrawing fluorinated feedstock as anode products. Said anode products can thus be collected separately from the cathode products if so desired. Cap 60 is provided for closing said exit vent as indicated by the dotted lines.

In one series of runs the porous carbon anode 40 was made of National Carbon Company Grade 45 carbon (NC–45) having a pore volume of about 0.5 cc. per gram with pore diameters ranging from 10 to 100 microns. The average pore diameter was about 58 microns. The anode assembly was postiioned in a hydrogen fluoride electrolyte, essentially like that described in the other examples, and immersed to the point indicated by the electrolyte level line in FIG. 2. With cap 60 in place, ethylene feed was started flowing into the anode through feed tube 42 at a rate of 10 liters per hour. The only place bubbles formed was in the top portion of the anode immediately adjacent seal 50, i.e., within the upper 0.25 inch of the anode. This demonstrates that the ethylene had entered the pores of the carbon anode near the bottom thereof and had flowed vertically through the inner connecting pores of the anode without escaping therefrom except at the top as described. The flow rate of ethylene was gradually increased to 60 liters per hour. At 60 liters per hour there was some breakout of feed at points lower than the upper 0.25 inch of the anode but still well within the upper portion of the anode. When the increased flow rate had reached 90 liters per hour, some bubble formation (breakout) was noted toward the bottom portion of the anode. However, it was observed that substantially all of the ethylene continued to flow up through the anode and exit therefrom in the top portion of the anode. When cap 60 was removed there was no breakout from the surface of the anode, even at the 90 liter per hour flow rate.

In another series of runs the porous carbon anode was fabricated from the above-described Stackpole 139 carbon having a pore volume of about 0.2 to 0.3 cc. per gram with the pore diameters ranging from 0.1 to 10 microns. These runs were made with cap 60 removed. Flow of ethylene was started at 2 liters per hour. No bubble formation outside the upper 0.25 inch portion of the anode was observed until the flow rate had reached 40 liters per hour. This run shows that the less permeable Stackpole 139 carbon will not permit as high a flow rate of gas through its pores as will the more permeable NC–45 carbon.

Another series of runs was made using the Stackpole 139 carbon anode with the cap 60 in place closing exit 58. At flow rates of 2 liters per hour essentially all of the breakout or bubble formation on the outer surface of the anode was within the upper 0.25 inch of the anode. At flow rates of 10 liters per hour there was some breakout (bubble formation) outside the upper 0.25 inch portion of the anode, but substantially all of the breakout was still in the upper 0.25 inch portion of the anode. At flow rates of 40 liters per hour the proportion of breakout outside the upper 0.25 inch portion of the anode increased, but the major portion of the gas was still exiting from the upper portion of the anode. These runs show that even with the less permeable Stackpole 139 carbon, the feed enters the anode near the bottom and flows up through the connecting pores and escapes from the upper portion of the anode.

EXAMPLE XI

Another series of runs was carried out for the electrochemical fluorination of ethane. The fluorination was carried out employing an anode assembly and cell arrangement essentially like that shown schematically in FIG. 4. The porous anode 60 was formed of the above-described Stackpole 139 porous carbon, had a side wall thickness of 0.635 centimeter, and had an outside vertical surface area of 30 square centimeters. The bottom surface was coated with a resistant cement to restrict the exposed geometric surface to the vertical portion only. The cathode 61 was formed of a cylinder of 20 x 20 mesh mild steel screen. The electrolyte employed was essentially anhydrous liquid hydrogen fluoride containing potassium fluoride as conductivity additive in the molar ratio of KF·2HF. Said runs were carried out at a temperature within the range of 82 to 84° C. The cell pressure was essentially atmospheric. The cell terminal voltage was in the range of 6.3 to 6.4 volts. The porous anode assembly comprised the porous carbon cylinder 60 which was threaded onto the lower portion of anode support and current collector 62 by means of the threads shown. Passageway 64 provided means for introduction of the feedstock to the small space 66 provided at the bottom of the anode. The top of carbon cylinder 60 was sealed by means of gasket 68. Plastic tape 63 (Teflon) was provided to protect the anode support 62.

In Run No. 1 said anode assembly was placed in the electrolyte with a small portion 70 (about 1/16 to 1/8 inch) of the anode exposed above the level of the electrolyte as shown in the drawing. The ethane feedstock was introduced into the bottom of the anode via feed passageway 64. It then passed vertically within the inner connecting pores of the carbon anode and the fluorinated products escaped therefrom into the vapor space in the cell above the electrolyte without bubbling through or passing out the confines of the anode below the electrolyte level. The absence of bubble formation of breakout of feed from the surface of the anode below the level of the electrolyte was confirmed by visual observations. The cell operated smoothly at a current density of 100 ma./cm.$^2$ under these conditions.

In Run No. 2 the cell arrangement was the same except that the anode assembly was lowered into the electrolyte until the entire carbon anode was immersed in the electrolyte and the level of the electrolyte was at point A shown in the drawing. This arrangement caused the fluorinated products to bubble out into the electrolyte within about the upper 0.25 inch portion of the anode as in the above-described Examples I–X. This bubble formation or breakout within the upper 0.25 inch portion of the anode was observed visually. The cell operated smoothly at 100 ma./cm.$^2$ under these conditions.

Other operating conditions and the results of said runs in terms of type and quantity of products obtained are given in Table VII below.

TABLE VII.—ELECTROCHEMICAL FLUORINATION OF ETHANE

| | Composition, mole percent | | |
|---|---|---|---|
| | Run 1 | Run 2 | Run 1, Table I |
| Current density, ma./cm.$^2$ | 100 | 100 | 100 |
| Ethane feed rate, liters/hr | 3.1 | 3.1 | 2.85 |
| Ethane feed rate, ml./min./cm.$^2$ (geometric area) | 1.72 | 1.72 | 1.58 |
| Ethane feed rate, ml./min./cm.$^2$ (cross-sectional area) | 87.7 | 87.7 | 80.6 |
| Conversion, percent | 17.9 | 17.6 | 23 |
| Compound: | | | |
| Ethyl fluoride | 65.9 | 64.3 | 64.1 |
| 1,1-difluoroethane | 6.8 | 7.2 | 9.6 |
| 1,2-difluoroethane | 7.9 | 8.0 | 11.5 |
| 1,1,1-trifluoroethane | 0.8 | 0.8 | 0.9 |
| 1,1,2-trifluoroethane | 5.5 | 5.9 | 4.8 |
| 1,1,2,2-tetrafluoroethane | 2.1 | 2.1 | 1.1 |
| 1,1,1,2-tetrafluoroethane | 1.7 | 1.7 | 0.8 |
| Pentafluoroethane | 2.3 | 2.5 | 1.3 |
| Hexafluoroethane | 4.9 | 5.2 | 3.9 |
| C$_4$ fluorides | 1.9 | 2.0 | 1.1 |
| C$_3$ fluorides | 0.1 | 0.2 | 0.9 |
| Vinyl fluoride | 0.1 | 0.1 | |
| | 100.0 | 100.0 | 100.0 |
| Current efficiency, percent | 77 | 77 | 87 |

Comparing the above Runs 1 and 2 in Table VII shows that said runs are an excellent check upon each other, clearly within the limits of experimental error. In both runs fluorination of the ethane took place within the pores of the anode. Run 1 from Table I has been included in the above Table VII for comparison purposes. Comparing said Run 1-Table I with Run 2 shows that results of the two runs agree within the limits of experimental error, thus showing that in said Run 1-Table I fluorination also took place within the pores of the carbon anode.

EXAMPLE XII

In these runs, a horizontal anode 72 as shown schematically in FIGS. 5 and 6 was employed. This anode was 3 inches in length, had a triangular cross section, each side surface was 1½ inches wide, and two surfaces and the ends and part of the third side were insulated with a resistant cement 74. This left 30 cm.$^2$ of uninsulated surface on the anode. This uninsulated surface was turned upward in the electrolyte bath to face an iron wire gauze cathode suspended above it about 1¾ cm. as shown in FIGS. 5 and 6. The electrolyte was the KF·2HF fused salt. In the run the following operating parameters were held constant: (1) current level: 6 amperes (current density, 200 ma./cm.$^2$); (2) nominal space velocity: 0.58 hr.$^{-1}$ (computed on the basis of no penetration of electrolyte in pores of carbon); (3) cell temperature: 93–95° C.; (4) feed: 1,2-dichloroethane; (5) feed rate: 0.22 g.-moles/ hr.; and (6) anode material: NC–60 porous carbon. The only variable in these runs was depth of the anode surface below the surface of the electrolyte. This was achieved by moving the cathode-anode assembly up and down in the electrolyte bath. The feed inlet and products outlet were each connected to conduits (not shown) which extended outside the cell. By this arrangement the feedstock was introduced into the pores of the anode and removed therefrom without contacting the main body of the electrolyte. Results obtained in these runs are summarized in Table VIII below.

TABLE VIII

| Products (mole percent) | Depth of immersion | | | | |
|---|---|---|---|---|---|
| | 9 | 6 | 6 | 6 | 2 |
| C$_2$Cl$_2$F$_4$ | 32.7 | 25.2 | 24.9 | 25.6 | 27.7 |
| C$_2$Cl$_2$HF$_3$ | 16.4 | 16.6 | 16.8 | 16.8 | 16.6 |
| C$_2$Cl$_2$H$_2$F$_2$ | 17.3 | 20.4 | 20.2 | 19.5 | 19.4 |
| C$_2$Cl$_2$H$_3$F | 23.1 | 25.3 | 25.5 | 24.7 | 24.2 |
| By-products | 10.5 | 12.5 | 12.6 | 13.4 | 12.1 |
| Conversion | 14.5 | 14.9 | 15.4 | 15.3 | 15.1 |

The by-products were essentially all trichloroethanes and monochloroethanes. Cleavage products and dimers and higher condensed products totaled less than 2% of the products in each run. In all runs the number of moles of effluent recovered was the same as the number of moles of 1,2-dichloroethane feedstock (within experimental error). This shows that all the feedstock and all the fluorinated products must have remained within the pores of the anode during the reaction and were withdrawn through the products outlet shown in FIG. 6.

These results demonstrate that a horizontal electrode can be employed under the conditions of the invention with respect to maintaining the fluorination reaction within the porous structure of the carbon anode.

EXAMPLE XIII

A series of runs was carried out for the electrochemical fluorination of 1,1-difluoroethane. The fluorination was carried out employing an anode assembly and cell arrangement essentially like that shown schematically in FIG. 4, and described above in connection with Example XI, except that porous anode 60 was formed of the above-described National Carbon Company Grade 60 (NC–60) porous carbon. The runs were carried out at a temperature within the range of 82 to 84° C. The cell pressure was essentially atmospheric. The cell terminal voltage was 7.0 volts. Run No. 1 and Run No. 2 were each carried out in the manner described in Example XI.

In Run No. 1, the absence of bubble formation or breakout of feed from the surface of the anode below the level of the electrolyte was confirmed by visual observation. The cell operated smoothly at a current density of 200 ma./cm.$^2$ under these conditions.

In Run No. 2, as in Run No. 2 in Example XI, the bubble formation or breakout into the electrolyte occurred within about the upper 0.25 inch portion of the anode. This was observed visually. The cell operated smoothly at 200 ma./cm.$^2$ under these conditions.

Other operating conditions and the results of said runs in terms of type and quantity obtained are given in Table IX below.

TABLE IX.—ELECTROCHEMICAL FLUORINATION OF 1,1-DIFLUOROETHANE

|  | Composition, mole percent | |
| --- | --- | --- |
|  | Run 1 | Run 2 |
| Current density, ma./cm.$^2$ | 200 | 200 |
| 1,1-difluoroethane feed rate, liters/hr | 6.1 | 6.1 |
| 1,1-difluoroethane feed rate, ml./min./cm.$^2$ geometric area of anode | 3.39 | 3.39 |
| 1,1-difluoroethane feed rate, ml./min./cm.$^2$ cross-sectional area of anode | 172 | 172 |
| Conversion, mole percent | 26.7 | 26.5 |
| Distribution of products, mole percent: |  |  |
| 1,1,1-trifluoroethane | 23.2 | 24.0 |
| 1,1,2-trifluoroethane | 42.9 | 45.5 |
| 1,1,2,2-tetrafluoroethane | 11.0 | 9.9 |
| 1,1,1,2-tetrafluoroethane | 10.6 | 9.8 |
| pentafluoroethane | 11.1 | 9.7 |
| hexafluoroethane | 1.2 | 1.1 |
| C$_4$ fluorides | Trace | Trace |
| C$_5$ fluorides | Trace | Trace |
| Current efficiency to fluorinated products | 95.5 | 91.6 |

Comparing the above Runs 1 and 2 in Table IX shows that said runs are good checks upon each other, clearly within the limits of experimental error. The data show that in both runs fluorination of the 1,1-difluoroethane took place within the pores of the anode.

As additional examples further illustrating the invention, when an ester such as ethyl acetate is fluorinated in accordance with the invention, the products which are obtained include ethyl monofluoroacetate, ethyl difluoroacetate; ethyltrifluoroacetate; and 1 - fluoroethylmonofluoroacetate. When the feedstock is a mercaptan such as ethyl mercaptan, the products which are obtained include 2-fluoroethyl mercaptan; 2,2-difluoroethyl mercaptan; and 2,2,2-trifluoroethyl mercaptan. When a feedstock such as n-propanol is fluorinated in accordance with the invention, the products obtained include 2-fluoropropanol; 2,3-difluoropropanol; and 3,3,3-trifluoropropanol. When an aromatic compound such as toluene is fluorinated in accordance with the invention, the products obtained include benzyl fluoride; benzylidene fluoride; benzylidyne fluoride; 4-fluorotoluene; 2,4-difluorotoluene; and 1-fluoromethyl-3-fluorobenzene. When a nitrile such as acetonitrile is fluorinated the products include 1,1,1-trifluoroethane; 1,1,1,2-tetrafluoroethane; 1,1,1,2,2 - pentafluoroethane; and trifluoroacetonitrile. When the feedstock is nitromethane, the products include: methane; carbon monoxide; nitrogen; carbon tetrafluoride; carbon dioxide; methyl fluoride; methylene fluoride; and fluoroform.

Herein and in the claims, unless otherwise specified, for convenience the volumetric feed rates have been expressed in terms of gaseous volume calculated at standard conditions, even though the feedstock may be introduced into the anode in liquid state.

Porous anodes which can be employed in the practice of this invention are disclosed and claimed in copending application Ser. No. 680,123, filed of even date herewith, in the name of W. V. Childs.

While certain embodiments of the invention have been described for illustrative purposes, the invention obviously is not limited thereto. Various other modifications will be apparent to those skilled in the art in view of this disclosure. Such modifications are within the spirit and scope of the invention.

We claim:

1. A process for the electrochemical fluorination of a fluorinatable organic compound feedstock, which process comprises: passing an electric current through a current-conducting essentially anhydrous liquid hydrogen fluoride electrolyte contained in an electrolysis cell provided with a cathode and a porous anode; passing said feedstock into the pores of said anode at a flow rate sufficient to establish a pressure balance within said pores between the feedstock entering said pores from one direction and electrolyte attempting to enter said pores from another and opposing direction and, within said pores, at least partially fluorinating at least a portion of said feedstock; passing fluorinated product and any remaining unfluorinated feedstock from within the pores of said anode; and recovering fluorinated product from an effluent stream from said cell.

2. A process according to claim 1 wherein said pressure balance is such as to permit up to about 50 percent of the pores of said anode to be invaded by electrolyte.

3. A process according to claim 1 wherein said flow rate of said feedstock is sufficient to supply the minimum amount of feedstock sufficient to furnish enough hydrogen values to prevent evolution of free fluorine but insufficient to cause breakout of said feedstock and/or fluorinated feedstock from within said pores into said electrolyte from a region other than within the top portion of said anode.

4. A process according to claim 1 wherein: said anode is porous carbon; and said feedstock is passed into the pores of said anode at a rate within the range of from 0.5 to 10 milliliters per minute per square centimeter of anode geometric surface area.

5. A process according to claim 4 wherein said anode has a pore volume within the range of from about 0.2 to about 0.5 cc. per gram with the pores ranging from 0.1 to 60 microns in diameter.

6. A process according to claim 1 wherein said anode is porous carbon; and said feedstock is passed into the pores of said anode, and therein into contact with a fluorinating species produced by said electrolysis, at a flow rate such that the inlet pressure of said feedstock into said pores is less than the sum of (a) the hydrostatic pressure of said electrolyte at the level of entry of said feedstock into said pores and (b) the exit pressure of any unreacted feedstock and fluorinated products from said pores into said electrolyte.

7. A process according to claim 6 wherein said flow rate is within the range of from 3 to 600 milliliters per minute per square centimeter of anode cross-sectional area.

8. A process according to claim 7 wherein the residence time of said feedstock and reaction products obtained therefrom within the pores of said anode is within the range of from 0.2 to 2 minutes.

9. A process according to claim 7 wherein the pores of said anode have a permeability within the range of from 0.5 to 75 darcys and an average pore diameter within the range of from about 20 to about 75 microns.

10. A process according to claim 1 wherein said pressure balance is such that essentially no unreacted feedstock and/or fluorinated product leaves said pores to form bubbles which escape from said anode into said electrolyte.

11. A process according to claim 10 wherein said flow rate is within the range of from 3 to 600 milliliters per minute per square centimeter of anode cross-sectional area.

12. A process according to claim 10 wherein said porous anode is porous carbon having a permeability within the range of from 0.5 to 75 darcys and an average pore diameter within the range of from 1 to 150 microns.

13. A process according to claim 12 wherein said porous carbon anode has a permeability within the range of from about 2 to about 30 darcys and an average pore diameter within the range of from about 20 to about 75 microns.

14. A process according to claim 12 wherein: said feedstock is selected from the group consisting of partially halogenated organic compounds containing from 1 to 6 carbon atoms per molecule, alkanes containing from 1 to 6 carbon atoms per molecule, and alkenes containing from 1 to 6 carbon atoms per molecule; said electrolyte contains a conductivity additive selected from the group consisting of ammonium fluoride and the alkali metal fluorides, said additive being present in a molar ratio of additive to hydrogen fluoride within the range of from 1:4.5 to 1:1; and said electric current is passed through said cell at a cell voltage within the range of from 4 to 20 volts and in an amount which is sufficient to provide a current density within the range of from 30 to 1000 milliamps per square centimeter of anode geometric surface.

15. A process according to claim 14 wherein said feedstock consists essentially of ethylene and said fluorinated product includes 1,2-difluoroethane.

16. A process according to claim 14 wherein said feedstock consists essentially of ethane and said fluorinated product includes ethyl fluoride.

17. A process according to claim 12 wherein said fluorinated product and any remaining unfluorinated feedstock are passed from within said pores of said anode directly into a space above said electrolyte within said cell.

18. A process according to claim 12 wherein said fluorinated product and any remaining unfluorinated feedstock are passed from within said pores of said anode directly into a collection zone which is at least partially within the confines of said anode.

19. A process according to claim 12 wherein said effluent stream from said cell comprises nonfluorinated feedstock and partially fluorinated feedstock, said effluent stream is passed to a product separation zone, nonfluorinated feedstock is withdrawn from said separation zone and at least a portion thereof is recycled to said cell as feedstock, and said partially fluorinated feedstock is withdrawn from said separation zone as product of the process.

20. A process according to claim 12 wherein said effluent stream from said cell comprises nonfluorinated feedstock, partially fluorinated feedstock, and perfluorinated feedstock; said cell effluent is passed to a product separation zone; at least a portion of said partially fluorinated feedstock is recycled from said product separation zone to said cell; at least a portion of said perfluorinated feedstock is passed to a combustion and hydrogen fluoride recovery zone; and at least a portion of the recovered hydrogen fluoride is passed from said combustion and recovery zone to said cell to replenish hydrogen fluoride consumed in the process.

References Cited

UNITED STATES PATENTS 2,519,983  8/1950  Simons _____ 204—59

FOREIGN PATENTS 740,723  11/1955  Great Britain.
741,399  11/1955  Great Britain.

HOWARD S. WILLIAMS, Primary Examiner